US00H002263H

(19) United States
(12) Statutory Invention Registration
Metzger et al.

(10) Reg. No.: US H2263 H
(43) Published: Sep. 6, 2011

(54) HARDENING OF A SATELLITE THERMAL CONTROL SYSTEM

(75) Inventors: William W. Metzger, Princeton Junction, NJ (US); Robert F. Schmicker, Island Heights, NJ (US)

(73) Assignee: The United States of America as represented by the Secretary of the Air Force, Washington, DC (US)

(21) Appl. No.: 06/700,989

(22) Filed: Oct. 3, 1984

(51) Int. Cl.
*B64G 1/52* (2006.01)

(52) U.S. Cl. ..... 244/171.8
(58) Field of Classification Search ..... 244/171.8, 244/171.7
See application file for complete search history.

(56) References Cited

U.S. PATENT DOCUMENTS

| | | | | |
|---|---|---|---|---|
| 2,489,879 | A | 11/1949 | Grebe | 160/6 |
| 2,553,073 | A | 5/1951 | Barnett | 126/638 |
| 2,954,728 | A | 10/1960 | Smith | 98/110 |
| 3,031,351 | A | 4/1962 | McIlvaine | 250/237 |
| 3,064,131 | A | 11/1962 | Brown | 250/203 |
| 3,121,794 | A | 2/1964 | Held et al. | 250/108 |
| 3,143,652 | A | 8/1964 | Bigelow | 250/105 |
| 3,204,690 | A | 9/1965 | Nyc | 160/176 |
| 3,744,478 | A | 7/1973 | Gopin | 126/270 |
| 3,768,754 | A | 10/1973 | Janes | 244/1 SC |
| 3,871,739 | A | 3/1975 | Poulsen | 350/1 |
| 4,071,771 | A | 1/1978 | Covic et al. | 250/505 |
| 4,706,740 | A * | 11/1987 | Mahefkey | 244/171.8 |

OTHER PUBLICATIONS

Schilling, Keith L., "A Simplified Lightweight Actuator for Spacecraft Thermal Control Employing Bimetallics." 1969.

* cited by examiner

*Primary Examiner*—Daniel Pihulic
(74) *Attorney, Agent, or Firm*—Donald J. Singer; Stanton E. Collier

(57) ABSTRACT

A thermal control system for a space body uses an active control means to prevent laser beam radiation damage to a heat radiator. A conventional louver and louver actuator are coupled to an active overdrive actuator that closes the louver when hostile laser radiation is present. An extended bimetallic coil spring with a heater therein rotates opposite to the louver actuator in an increasing temperature environment. A cam of the overdrive actuator engages a louver arm when hostile laser radiation is present, otherwise, the louver can move freely within the cam.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
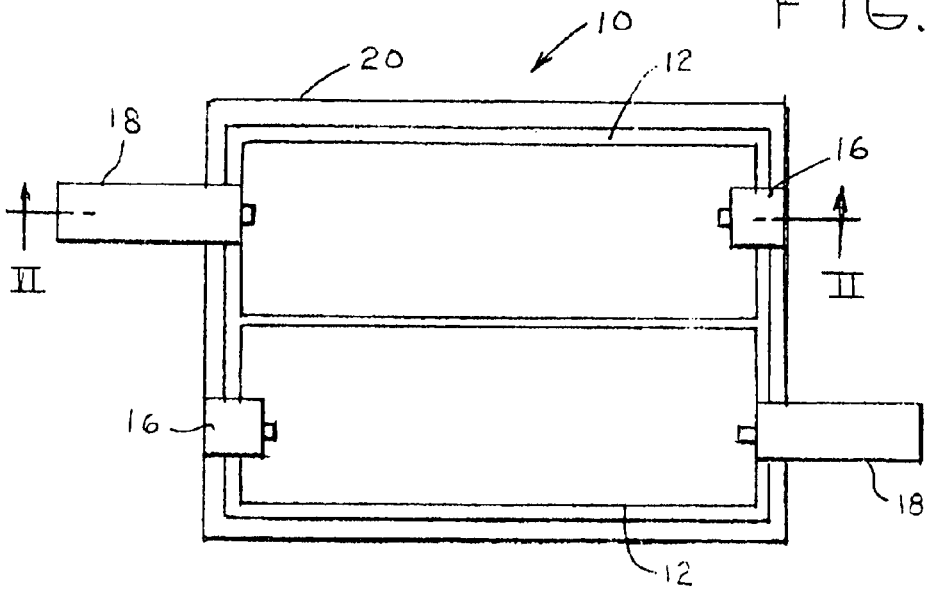
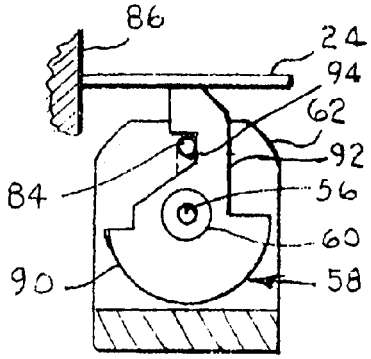
FIG. 3A
FIG. 3B
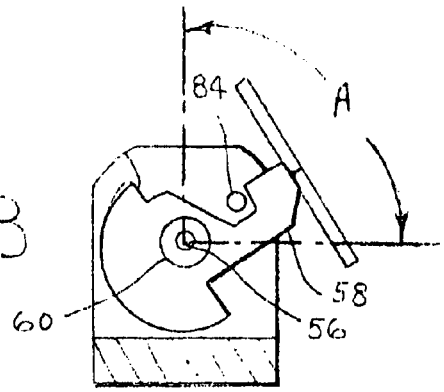
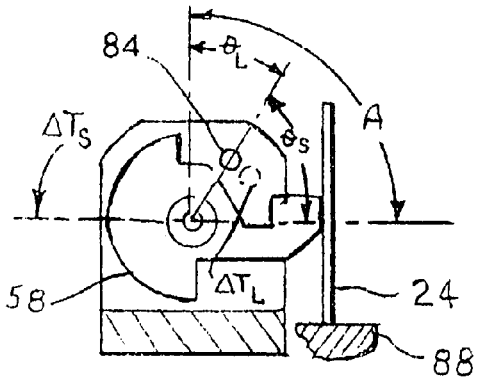
FIG. 3C

HARDENING OF A SATELLITE THERMAL CONTROL SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to space vehicles and, in greater particularity, relates to a device and method of protecting selected surfaces on the space vehicle from external incident radiant energy.

Many satellite components require temperature control within a narrow band to assure long life and correct operation. One temperature control method is to enclose the instrument either singly or in a group inside a chamber which is designed to have good internal thermal coupling so as to give near uniform internal temperature. One side of the chamber is a radiator: a good conductor which is thermally coupled to heat sources inside the chamber and which has a high emissivity surface facing dark space. Finally, this radiator is covered by louver blades arranged so they can be opened or closed, exposing or covering the radiator. Rectangular blades in a venetian blind like arrangement are illustrated in FIGS. 1 and 2. A pinwheel arrangement has also been used. In either case, a bimetallic coil spring, thermally coupled to the radiator senses the temperature of the radiator, opening the louver when the radiator is warm and closing it when the radiator is cool with respect to the control range, and generally finding an intermediate position to maintain the specified temperature. This thermo-mechanical mode of operation is called the "passive mode."

More precise control of the radiator temperature is accomplished by adding an electronic device to sense the radiator temperature and to control an electric current to a heater which is bonded onto the bimetallic coil. This "active mode" gives greater rotation of the louver per unit temperature change due to its amplification and accomplishes quicker, more precise temperature control; solar and earth albedo energy are prevented from entering the louver by three methods:

(1) keeping the radiator surface always directed toward dark space, (2) providing a thermal fence to shield the radiator, and (3) coating the radiator and louver blades with a material which gives a low solar absorptivity while still giving high emissivity.

If hostile high energy radiation such as a laser beam is directed at the louver, it presents a dual threat:

(1) the energy may be absorbed into the exposed surface materials, heating them until they are destroyed, and (2) as the radiant energy heats the exposed surfaces, that heat is conducted to the bimetallic coil springs causing the coil springs to open the louver completely exposing the radiator and admitting even more radiation. Then, the thermal control louver is rendered inoperative and more radiant energy is admitted directly into the radiator.

Existing louvered radiator designs are extremely vulnerable to laser attack because of the light weight materials generally used, the sensitivity of their performance to the radiative characteristics of their surface, and in some cases, the fundamental conflict between radiative characteristics desirable for their normal function and those desirable for rejecting laser radiation.

These drawbacks have motivated the search for alternative devices which can prevent laser damage to radiators in space.

SUMMARY OF THE INVENTION

A conventional bimetallic temperature sensitive actuator controls the movement of a louver used to control heat from a radiator. If satellite components to be protected reach an excessive operating temperature, the actuator, being thermally coupled to the radiator, opens the louver thus permitting excess heat to be radiated into space. When the components cool, the actuator closes the louver to retain heat within the system.

In the case of hostile high energy radiation, (i.e. a laser beam) directed in the direction of the louver, the energy may be absorbed into the exposed surface materials heating them until they are destroyed. This heat is conducted to the actuator which opens the louver and further exposes the internal components to excess radiation which would not have been admitted if the louver remained closed.

In order to counter this destructive radiation that is incident on the louver, a combination of steps are taken. Firstly, the louver surface is coated with a protective coating to prevent the absorption of incident radiation. Secondly, a bimetalic overdrive actuator positioned opposite to the louver actuator, acting through a cam and pin assembly, drives the radiator louver in the opposite direction than that of the louver actuator. A shield attached to the overdrive actuator, normally in the open position, allows the incident radiation to heat a bimetallic coil. This coil turns counter to the radiator actuator bimetallic coil forcing the louver radiator to close.

The cam and pin arrangement allows the louver actuator to rotate without interference from the overdrive actuator unless excessive heat is received by the overdrive actuator. Thus, in the presence of excessive thermal radiation, the louver and the shield are closed.

An electronic sensor is attached to the thermal control system so that a more rapid response is produced than by just the bimetallic coils of the overdrive actuator alone.

It is therefore an object of the present invention to provide for a laser hardened thermal control system for a satellite or other space object;

It is another object of the present invention to provide for a protective coating to the materials used in the thermal control system;

It is another object of the present invention to provide for an overdrive actuator that closes a louvered radiator upon receiving laser radiation;

It is another object of the present invention to provide for an active overdrive actuator rather than passive.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 1 is a plan view of the louvered thermal control system of the present invention.

FIGS. 3A, 3B, and 3C shows the operation of the cam and pin arrangement of the present invention and is taken along lines IIIA-IIIA of FIG. 2;

DETAILED DESCRIPTION OF THE PREFERRED EMBODIMENT

Figure 2:
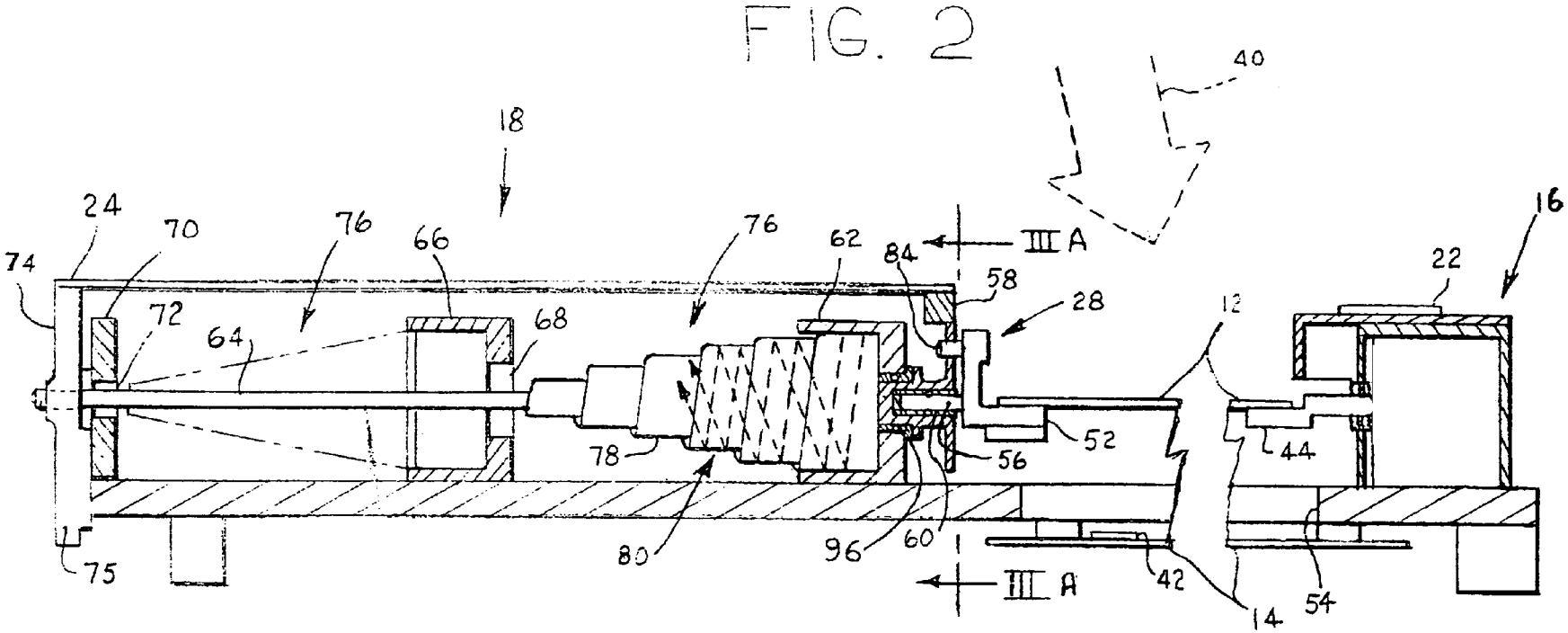
FIG. 2 is a cross section taken through one louver assembly of FIG. 1 of the present invention.

Referring to FIG. 1, a thermal control system 10 is shown. Louvers 12 control heat flow from a radiator 14, shown in FIG. 2. Conventional louver actuators 16 sense the temperature of radiator 14 and cause louvers 12 to rotate to an open position to allow the flow of heat to space. Actuators 16 have therein bimetallic coil springs with heaters thereon so that when heated, louvers 12 rotate open. Overdrive actuators 18 upon receiving a high temperature rise indication cause louvers 12 to be placed in the closed position, shown in FIGS. 2 and 3A, even when louver actuators 16 desire to rotate open louvers 12. Details to be provided herein below.

Specific requirements of louvered temperature-control radiator 14 vary substantially from one spacecraft to another, and within any one spacecraft, depending on (a) area available; (b) internal heat loads—average power, peak power, and duty cycles; (c) temperature-control-range requirements; (d) the size, location, and thermal characteristics of other parts of the spacecraft that are within the hemispheric field of view of the radiating surface; and (e) the ranges and variations of normal and abnormal directions of view of the surface normal with respect to the sun, the earth (with sunlit and dark as essential distinctions) and space. This variety tends to make it impossible to define a general set of radiator functional requirements as a baseline for laser hardening; however, the task becomes more reasonable when looked at from the viewpoint of how dominant the laser-resistance requirements are, and in recognition of the basic design choice that is always available, that of the size of radiator 14 that is most appropriate to meeting its functional requirements.

Although a battery radiator is used for purposes of explaining the invention, other types of radiators are functionally equivalent. In this case radiator 14 is a wall of a battery, not further shown.

Battery radiator 14 has three attributes: First, the radiator surface itself has excellent heat-sinking capabilities; it is the solid aluminim base of the battery itself. Second, to accommodate the high worst-case heat loads generated by internal dissipation in the battery, an unlouvered passive "bias" radiator is incorporated, in addition to the actively controlled louvered radiator. Third, the sun never directly impinges on the main radiator in normal mission attitude (a thermal fence 20—a rudimentary sunshade—is provided in order to preserve this condition for small sun angles on the "wrong" side of the orbit plane). The absorptivities and emissivities of the louver-blade coatings and radiator coatings have been selected to take advantage of the fact of no solar illmination; in particular, high emissivities can be chosen for the radiator surface and low emissivities for the lower blade surface without regard to the absolute solar absorptivity or the $\alpha/\epsilon$ ratio—radiators in spacecraft locations that do see the sun must take $\alpha/\epsilon$ into account. The impact of relative solar orientation results in a substantial variety of surface-finish choices and combinations for louver blades and inner radiator surfaces in radiators for various functions on the spacecraft, of which the battery radiator is only one.

In spite of the range of design parameters that will consequently characterize different radiators for the infinite variety of spacecraft applications, it should be noted that the detailed requirements of battery radiator 14 used have not resulted in a hardening solution that is peculiar to the specific application. The same invention is applicable to louvered radiators with substantially different load-dumping, temperature, and radiant-interface requirements; the area of radiator 14 and the temperature set-point and gain of a control loop would be the principal design parameters that would be adjusted to adapt to differing applications.

Since Denton silver has both a low absolute emissivity and a relatively favorable $\alpha/\epsilon$ ratio for sun rejection, it can be used on both sun-exposed and sun-shaded louvers 12. The Z93 white paint has excellent emissivity and a very good $\alpha/\epsilon$ ratio, so it can be substituted for second-surface teflon in sun-exposed radiator applications with little or no compromise in performance.

The threat to thermal control system 10 is hypotheized to be a laser pulse of 100 seconds total duration, of 1 watt per square centimeter intensity at onset and at termination, of 10 watts per square centimeter intensity at peak, following a cosine-squared law for the intensity variation with time, depositing 550 joules per square centimeter total energy, and generated by a carbon dioxide laser at 10.6 centimeters wavelength.

No amelioration has been allocated to partial shielding by other spacecraft parts or to non-normal incidence. In addition, it has been postulated for conservatism that the full threat could be (transiently) incident on the inner surfaces of louvers 12; these surfaces have also been made hard against direct exposure, by coating them, also, with Denton silver. Analytic consideration has been given to the effects of changing these inner-surface finishes, for the eventuality that the assumption of direct exposure turns out to be unnecessarily pessimistic. Blackened inner surfaces, rather than Denton-silvered, would raise the maximum attained temperature of the radiator 14 proper somewhat, while substantially lowering that of the louver blade. Both choices lead to acceptable attained temperature limits for both components, and so a change from Denton silver would be dictated by factors that are presently not operative, such as higher threat levels, different time profiles, or weight limitations that call for consideration of blade materials lighter than Kovar.

The solution to the above problems is: (1) the use of protective coatings to exposed surfaces to prevent the absorption of the incident hostile laser energy, and (2) overdrive actuator 18 having a laser beam sensor 22.

Figure 5:
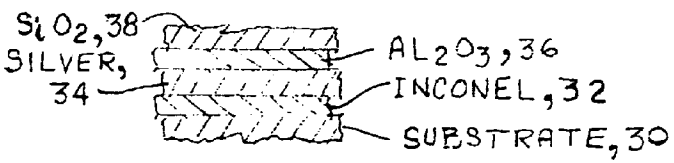
FIG. 5 is a cross-section of the materials applied to protect the surfaces.

Referring to FIG. 5, a Denton silver coating 26, is applied to the top of overdrive shield 24, to radiator louver 12, both sides preferrably, and to other exposed parts such as a louver arm 28.

The principal characteristics of Denton silver coating 26 are given in Table 1.

TABLE 1

| Principal characteristics of Denton-silver coating |
|---|
| a. Process<br>Substrate - Mirror finish, flat or slightly curved, metal or glass (also tapes and films attached to solid substrates for coating purposes)<br>Primer film - Approximately 500 Angstroms (Å) Inconel<br>Silver film - Approximately 100 Å, purity 99.8%<br>Protective interface film - Approximately 1300 Å reagent grade $Al_2O_3$<br>Protective surface film - Approximately 1300 Å reagent grade $SiO_2$ |

TABLE 1-continued

| Principal characteristics of Denton-silver coating |
|---|
| b. Finished Coating<br>Reflectance - More than 98% at any wavelength from 0.5 to 50 micrometers |

In particular, suitable substrate materials may be aluminum, nickel, stainless steel, glass or tape. Surfaces to be coated shall have mirror finish and surfaces to be coated shall preferentially be flat or slightly curved whereby the angle of deviation shall not exceed 30°.

When faces join in an angle greater than 30°, the respective faces shall be coated separately with the alternate face masked. The radius of edges and corners shall be as small as possible so as to minimize areas of marginal coating quality such as optical imperfection and low adhesion. Surface steps shall be avoided.

The coating process starts with an Inconel primer film 32 made from reagent grade Inconel. The Inconel film shall be deposited from a tungsten resistance heater to a thickness of approximately 500 Angstrom in 5×10−5 torr vacuum in accordance with U.S. Pat. No. 3,687,713 .

Next, a silver film 34 of a purity greater than 99.8% is deposited. Silver film 34 shall be deposited from a tungsten resistance heater to a thickness of approximately 1,000 Angstrom in 5×10−5 torr vacuum in accordance with U.S. Pat. No. 3,687,713.

Although Denton silver was used as protective coating 26 against a $CO_2$ laser beam, other types of coatings are clearly feasible and are applied in a similar manner as described above where different types of lasers are used.

In order to protect radiator 14 against a laser beam 40, FIG. 2, radiator louver 12 must be rapidly closed against the normal opening tendency supplied by convential louver actuator 16.

Referring to FIG. 1, thermal control system 10 has two louvers 12 shown. Additional louvers 12 are possible depending on heat transfer requirements. As shown, louver actuators 16 and overdrive actuators 18 are at opposite ends of louvers 12. Although this placement is preferred because of present devices, the placement at one end of these actuators 16 and 18 is also possible and the principles of this invention are still applicable even though the mechanical design would be complicated to a greater degree.

In order to describe the operation of this invention a partial cross section, FIG. 2, is taken through the longitudinal axis along lines II-II of FIG. 1.

Figure 4:
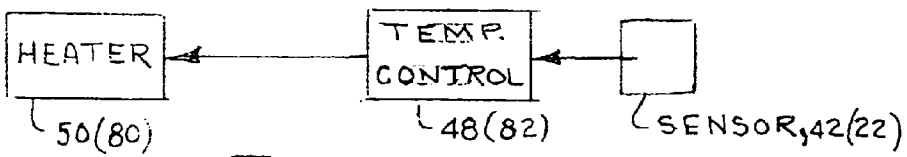
FIG. 4 is a functional block schematic of an active thermal control used on the thermal control system of the present invention.

In FIG. 2, convention louver actuator 16 having a bimetallic coil spring therein with attached heater, not shown, is connected to louver 12 by an arm 44. The heater in actuator 16 receives driving current in response to a temperature radiator sensor 42. The current is controlled by means of a circuit shown in FIG. 4 where temperature sensor 42 sends data to a temperature control device 48 that in turn sends current to a heater 50 such that a higher temperature causes actuator 16 to open louver 12 to allow heat radiation.

Louver 12 is further connected to a pin arm 52 that rotates in overdrive actuator 18. The opening of louver 12 allows heat to flow from radiator 14 through an aperature 54. Pin arm 52 turns on an axle 56 which is mounted in a cam 58 of overdrive actuator 18A. A bearing 60 allows for minimum friction between axle 56 and cam 58. Cam 58 is mounted in a drive support 62 with a bearing 96. Attached to cam 58 is a drive shaft 64. Drive shaft 64 is mounted to a center support 66 with a bearing 68 and to a end support 70 with a bearing 72. Further attached to cam 58 is overdrive shield 24. On the other end of shaft 64, a shield support 74 is mounted to both shaft 64 and shield 24. A counter balance 75 minimizes the amount of torque needed to move shield 24 and louver 12.

A bimetallic overdrive assembly 76, only one shown in detail, is mounted to support 62 and shaft 64. The purpose of an extended bimetallic coil spring 78 is to expose as much as possible of coil 78 to incoming laser radiation beam 40 so that the heating provided causes spring 78 to counter rotate to the bimetallic coil spring mounted in louver actuator 16. If so required, additional bimetallic coils 78 can be mounted to shaft 64 to provide the necessary torque and heating surface to close louver 12 to laser radiation 40.

In addition to or in the alternative, a heater 80, shown in outline on spring 78, can heat bimetallic coil spring 78 to provide the necessary torque in a much quicker manner. This is preferable since a quicker closing of louver 12 can be obtained without possible damage to radiator 14. The presence of laser radiation 40 is detected by a sensor 22 which sends data to a temperature control 82. The circuit provided would be similar to that shown in FIG. 4. Sensor 22 is shown as being flat but a more omni-directional sensor 22 will be used to detect laser radiaton 40 at different angles.

To better understand the interaction between cam 58 and a pin 84 of pin-arm 28 a cross section along lines III A-III A is shown in FIG. 3A.

FIG. 3A shows shield 24 in a closed position resting against a stop 86 when laser radiation 40 is received and responded to. FIG. 3C shows cam 58 in the normally open position with shield 24 resting against a stop 88. The symbols shown in FIG. 3C are hereafter used in an analysis of the interaction between bimetallic overdrive assembly 76 and pin 84 of pin-arm 28 that is attached to louver 12. An intermediate position is shown in FIG. 3B where cam 58 has not engaged pin 84.

In normal operation pin 84 can move through a 90° angle. Upon the receipt of laser radiation 40, bimetallic overdrive assembly 76 causes cam 58 to move in a counter-clock wise direction. If sufficient energy is received, pin 84 is engaged and turned to the position shown in FIG. 3A where both shield 24 and louver 12 are in the closed position. Referring to FIG. 3A, cam 58 has a counter balance 90 mounted opposite shield 24. Shield 24 is mounted to an arm 92 that has therein a pin engagement slot 94. As shown in FIG. 3C, when cam 58 is in the fully open position, pin 84 can rotate through a full 90 degree angle without contacting slot 94. In the fully closed position, FIG. 3A, slot 94 forces pin 84 into a vertical position thus closing louver 12.

In the following analysis, heater 80 is not considered attached to bimetallic coil spring 78. This is named the "passive mode" and provides a minimum response to the intended threat assumed by the present invention.

The following nomenclature is used throughout the analysis presented:

T=temperature, °C.

$T_o$=set point temperature

ΔT=temperature change, °C.

P=Coupling load, in. -lb

α=bimetallic spring angular thermal expansion coefficient, degrees/°C.

k=bimetallic spring angular spring rate, in.-lb/deg.

θ=angular positions, degrees, see FIG. 3C

A=allowable angular travel between louver and shield, degrees=90°.

Subscripts:

L=louver

S=shields o=initial condition

For each of the bimetallic springs which drive louver 12 as well as shield 24, the following relationship exists between the spring angular position and temperature change, i.e.

$$\theta=\theta_o+\alpha_T\Delta T \tag{1}$$

When overdrive spring 78 is coupled (i.e. contacted) with the louver spring, not shown, a constraining force will be developed and Equation (1) is no longer valid. A general coupling equation is derived which will relate the angular position of louver 12 and shield 24 for arbitrary initial angular position and for any temperature changes for louver 12 and for shield 24.

Assume that at certain temperature changes, $\Delta T_L$ and $\Delta T_S$, louver 12 and shield 24 are coupled as shown in FIG. 3C. Louver 12 rotates through an angle $\theta_L$ and shield 24 rotates an angle $\theta_S$ and their final positions are designated as $\theta_L$ and $\theta_S$, respectively. When the coupling load between them is P, the compatibility condition is:

$$\theta_L+\theta_S=A \tag{2}$$

But the angles are individually given by:

$$\theta_L = \Delta T_L\alpha_L - \frac{P}{K_L} + \theta_{OL} \tag{3}$$

$$\theta_S = \Delta T_S\alpha_S - \frac{P}{K_S} + \theta_{OS} \tag{4}$$

The first term on the righthand side of Equations 3 and 4 gives the amount of unrestrained rotation for a given temperature rise and the second term represents the reduction of rotation due to the coupling load. The third terms are the initial locations.

Substituting Equations 3 and 4 into Equation 2 and solving for P gives:

$$P=X/Y \tag{5}$$

where:

$$X = \Delta T_L\alpha_L + \Delta T_S\alpha_S + \theta_{OL} + \theta_{OS} - A \tag{6}$$

$$Y = \frac{1}{K_S} + \frac{1}{K_L} \tag{7}$$

Substituting Equation 5 into Equation 3 gives:

$$\theta_L = \Delta T_L\alpha_L - \frac{X}{K_L Y} + \theta_{OL} \tag{8}$$

where:

$$\Delta T_L=T_L-T_{OL} \tag{9}$$

$$\Delta T_S=T_S-T_{OS} \tag{10}$$

and X, Y are given in Equations 6 and 7.

Equation 8 is the general coupling equation which allows arbitrary louver 12 and overdrive spring 76 characteristics and initial locations. For the configuration shown on FIG. 3C, all bimetallic springs are identical, so that $\alpha_S=\alpha_L=\alpha$, and $k_s=2k_L=2k$. For this case Equation 8 can be reduced to:

$$\theta_L = \Delta T_L\alpha - \frac{2}{3}[(\Delta T_L + \Delta T_S) + \alpha + \theta_{OL} + \theta_{OS} - A] + \theta_{OL} \tag{11}$$

Since in Equation 5 we define the coupling load as P =X/Y, the temperature rise required for coupling to start can be found by setting P=0 or X=0.

Thus, Equation 6 becomes:

$$X = \Delta T_L\alpha + \Delta T_S\alpha + \theta_{OL} + \theta_{OS} - A = 0 \tag{12}$$

Now substituting Equation 9 and Equation 10 into Equation 12 gives:

$$(T_L-T_{OL})\alpha+(T_S-T_{OS})\alpha+\theta_{OL}+\theta_{OS}-A=0 \tag{13}$$

For the special case of $T_L=T_S=T$, the above equation leads to:

$$T = \frac{A - \theta_{OL} - \theta_{OS} + \alpha(T_{OL} + T_{OS})}{2\alpha} \tag{14}$$

The temperature rise required to close louver 12 can be determined by setting $\theta_L=0$ in Equation 8, or $$\alpha_L\Delta T_L = \frac{x}{K_L Y} - \theta_{OL}$$

Another special case of interest is when only one of the overdrive springs 78 is heated. For this case, $K_S=K_L=K$, then Equation 7 leads to $K_L Y=2$, and for $\theta_L=0$, Equation 8 becomes:

$$\alpha\Delta T_L = \frac{X}{2} - \theta_{OL} \tag{17}$$

Substituting the definition of X from 6, Equation 17 is simplified to:

$$\Delta T_S - \Delta T_L = \frac{A - \theta_{OS} + \theta_{OL}}{\alpha} \tag{18}$$

The Chace 6650 bimetallic spring 78 angular rotation-temperature relationship can be described by the following linear equation:

$$\theta = \theta_o + \alpha_T\Delta T \tag{19}$$

where: $\theta_o$=initial angular position for $\Delta T$=o, degrees $\alpha T$ =bimetallic spring angular thermal expansion coefficient degrees/degree °C.

Since the overdrive springs 78 are elongated from an ordinary spring, a Tenney chamber test was performed to determine $\alpha_T$. The average $\alpha_T$ was computed to be 10.6 degrees/°C., by using a least square straight line fit technique. In the subsequent calculations, a nominal value of:

$$\alpha_T=9 \text{ Degrees/°C.}=5 \text{ Degrees/=°F.} \tag{20}$$

is used. This is the design value for this particular spring which was calculated from the Chace design manual.

It is informative to do some additional analysis of the laser test conditions. Using the overdrive spring 78 characteristics and equation 18 for only one overdrive spring heated, it is estimated that the temperature of the overdrive spring 76 is at louver 12 closing, i.e.

$$\Delta T_S - \Delta T_L = \frac{A - \theta_{OS} + \theta_{OL}}{\alpha_T} = \frac{90° - 5° + 15°}{5} = 20° \text{ F.} \tag{21}$$

or $$(T_S - T_{OS}) - (T_L - T_{OL}) = 20° \text{ F.} \tag{22}$$

then $$T_S = T_{OS} + (T_L - T_{OL}) + 20 = 77 + 12 + 20 = 109° \text{ F.} \tag{23}$$

For the case where both overdrive springs 78 are heated by laser radiation 40, the temperature $T_S$ at louver 12 closing can be calculated using Equation 8 by letting $\theta_L$=0 and $K_L Y = 3/2$, and use Equation 6 for x, i.e.

$$0 = \Delta T_L \alpha - \frac{2}{3}(\Delta T_L \alpha + \Delta T_S \alpha + \theta_{OL} + \theta_{OS} - A) + \theta_{OL} \tag{24}$$

which can be simplified to:

$$2\Delta T_S - \Delta T_L = \frac{2A + \theta_{OL} - 2\theta_{OS}}{\alpha} \tag{25}$$

$$T_S = T_{OS} + \frac{1}{2}\frac{(\Delta T_L \alpha + 2a + \theta_{OL} - 2\theta_{OS})}{\alpha} \tag{26}$$

From the tests it was determined that $$T_S = 77 + \frac{1}{2}\frac{(12 \times 5 + 2 \times 90 + 15 - 2 \times 5)}{5} = 101.5° \text{ F.}$$

Assuming the overdrive spring 78 temperature rises linearly, then, from the test data, the rate of temperature rise is $$= \frac{107 - 75}{34} = 1° \text{ F./second} \tag{27}$$

Then, if both springs are illuminated by the laser, the final temperature $T_S$=100° F. can be reached 9 seconds sooner, or it would take 25 seconds to close the louver if both the overdrive springs 78 are heated, instead of 34 seconds.

Although the invention has been described with reference to a particular embodiment, it will be understood to those skilled in the art that the invention is capable of a variety of alternative embodiments within the spirit and scope of the appended claims.

What is claimed is:

1. A thermal control system for a body in space, said thermal control system regulating heat flow from a radiator, said heat flowing from said radiator through an aperture in said body, said thermal control system comprising:

at least one louver positioned above said aperture, said louver rotating about a longitudinal axis such that in a first position said louver prevents heat flow and in a second position only minimally blocks heat flow, said louver rotating between said first and said second position, said louver fixedly connected to an actuator arm and to a pin-arm, said arms positioned in said longitudinal axis;

at least one louver actuator, said louver actuator rotating said louver by said actuator arm, said actuator having therein a bimetallic coil spring having therein a heater that is controlled by a temperature of said radiator, said actuator opening said louver as said radiator's temperature rises;

at least one overdrive actuator, said overdrive actuator sensing incoming hostile radiation and closing said louver to protect said radiator, said overdrive actuator closing a shield to protect said overdrive actuator from laser damage;

a protective reflective coating, said coating applied to surfaces exposed to hostile radiation; and a thermal fence, said fence placed about said louver, said fence protecting said radiator from low incident radiation.

2. A thermal control system as defined in claim 1 wherein said protective reflective coating is applied to a substrate having a mirror like finish.

3. A thermal control system as defined in claim 2 wherein said substrate includes a tape, said tape applied to curved surfaces being difficult to coat by vapor deposition.

4. A thermal control system as defined in claim 2 wherein said coating comprises a primer film, a silver film, a protective interface film, and a protective surface film.

5. A thermal control system as defined in claim 4 wherein said primer film is Inconel, said protective interface film is $Al_2O_3$, and said protective surface film is $SiO_2$.

6. A thermal control system as defined in claim 1 wherein said overdrive actuator comprises:

at least one overdrive support, said overdrive support attached to said body, an end support, said end support fixedly attached to said body;

a drive shaft rotatably mounted in said drive support and said end support;

at least one bimetallic coil spring assembly mounted to said overdrive support and said drive shaft, said assembly having an extended bimetallic coil spring with a heater thereon, said heater operating in response to incoming hostile radiation to close said louver;

a cam fixedly attached to said drive shaft and rotatably secured to said drive support, said pin-arm fixedly attached to said louver being rotatably mounted to said cam such that a pin thereon is engaged by said cam upon the receipt of a given level of hostile radiation, otherwise said pin rotating freely within said cam;

a counterbalance, said balance fixedly mounted to said drive shaft near said end support; and an overdrive shield, said shield fixedly mounted to said counterbalance and said cam, upon the receipt of a given level of hositle radiation, said shield protects said coil spring assembly, said shield and said louver being in a closed position when a given level of hostile radiation is present.

* * * * *